April 19, 1966   W. A. MOORE   3,246,727
CLUTCH WITH RAPID ACTING CENTRIFUGAL ACTUATOR
Filed Oct. 11, 1963   3 Sheets-Sheet 1

INVENTOR.
WILLIAM A. MOORE
BY

April 19, 1966 W. A. MOORE 3,246,727
CLUTCH WITH RAPID ACTING CENTRIFUGAL ACTUATOR
Filed Oct. 11, 1963 3 Sheets-Sheet 3

INVENTOR
WILLIAM A. MOORE
BY

United States Patent Office 3,246,727
Patented Apr. 19, 1966

3,246,727
CLUTCH WITH RAPID ACTING
CENTRIFUGAL ACTUATOR
William A. Moore, Los Angeles, Calif., assignor to Whittaker Corporation, a corporation of California
Filed Oct. 11, 1963, Ser. No. 315,592
5 Claims. (Cl. 192—105)

This invention relates to a novel actuating means and more specifically is directed to a motor-energized, centrifugally-operated valve closure mechanism.

Prior actuators of this general type had the inherent problem of developing sufficient stored energy to provide an adequate actuating force. In an attempt to solve this problem, means were provided to amplify the force generated, including the use of various reduction gear configurations to increase the amount of usable force. This approach necessarily resulted in quite complex actuator arrangements and consequent increased maintaince problems. Despite these prior efforts, no efficient actuator has been developed which maximizes the efficient conversion of generated energy to end actuating force.

Applicant's invention is especially directed to a particular design of the weights and their inter-relationship with the retaining spring. The purpose of this design is to provide a device for storing up a vast amount of potential energy in the rotating weights and simultaneously providing a means whereby this stored up energy can be released as effective power in a small increment of time upon reaching a predetermined terminal speed. In prior centrifugal clutches, a continuous increase in speed of rotation of the centrifugal weights resulted in a simultaneous continuous movement of said weights in an outward direction. Since it was not desired to have the weights swing out at too rapid a rate, heavy restraining springs had to be employed. However, a substantial amount of the energy generated was dissipated in overcoming the restraining force of the spring. Consequently, when the weights contacted the driven member, little force was available for transmission to the driven member. Furthermore, since the outward movement of the weights was continuous, contact between the weights and the driven member was gradual.

Applicant provides an actuating mechanism which, due to its unique design, stores a vast amount of energy in the rotating weights before any substantial radical movement of the weights takes place. The restraining springs employed by applicant are very light, and consequently only a little energy is dissipated in overcoming the spring force. Upon reaching a predetermined speed of rotation, the weights swing outward in an extremely fast, accelerating fashion, contacting the driven member wtih tremendous force. The stored up energy is thereby instantaneously applied to the driven member in a fast and efficient manner. The invention is particularly applicable to valves which undergo intermittent actuation and have valve sticking problems. The sharp force applied tends to break loose the valve for easy operation. The actuator would have obvious application where icing of valves is a problem.

It is accordingly an object of this invention to provide an actuator capable of efficiently converting the generated force to an actuating force.

Another object of the invention is to provide an actuating device having a substantially constant available output torque.

A still further object of the invention is to provide an actuator capable of storing generated energy for a predetermined period of time and releasing said energy in the form of a predetermined output torque.

Yet another object of this invention is to provide a valve actuating means capable of providing a constant output torque by the utilization of a unique centrifugal clutch which is capable of storing a substantial amount of energy and releasing said energy at a predetermined time.

A further object of this invention is to provide a valve actuator generally comprising a centrifugal clutch, a motor driving said clutch, and a valve connecting means, whereby a vast amount of energy developed by said motor is stored in the centrifugal clutch member and released as a useful valve actuating force.

A still further object of the invention is to provide a centrifugal actuator capable of using relatively light restraining springs.

Another object of the invention is to provide a centrifugal actuator having a plurality of movable armatures with means to insure simultaneous movement of the respective armatures.

Yet another object of the invention is to provide a centrifugal actuator having a flexible member cooperating with the centrifugal components to insure more positive cooperation between the driver and driven elements.

Other and different objects will become apparent by reference to the following specification and drawings in which:

FIGURES 6 and 7 are schematic drawings of a centrifugal actuator showing the forces generated therein.

FIGURE 8 is an isometric view of one embodiment of the invention.

The instant invention generally consists of an actuator including a motor, centrifugal clutch and a valve. A direct coupling is provided between the motor and the centrifugal clutch. The centrifugal clutch is segmented. Each segment is joined by interlocking gear teeth to insure simultaneous operation. The segments revolve within a cup-like driven member which serves as one of the clutch faces. The segments are designed to rotate within the cup and out of contact with the cup until a predetermined speed is reached. Upon reaching said speed, the segments, due to the centrifugal force generated, begin to swing outward and into contact with the inside of the cup. The specific design of the segments and the retaining springs and their particular cooperative relationship enable a positive locking relationship between the segments and the cup. The driven member is integral with a valve member, such that movement of the driven member through an angle of 90° serves to open the valve with a positive snap action. Stops are provided to limit rotation to 90°. Upon reaching the stop limit, the purely frictional contact between the centrifugal member and the cup-like driven member permits relative slippage therebetween. Switch means are provided to break the circuit to the motor when 90° rotation is achieved, thereby removing the power enabling the maintenance of the centrifugal members in contact with the cup, and the segments accordingly are returned to their original position by the spring retaining means. Closing of the valve is achieved by identical operation, except that the application of electrical power to the motor is reversed in a well-known manner.

Figure 1:
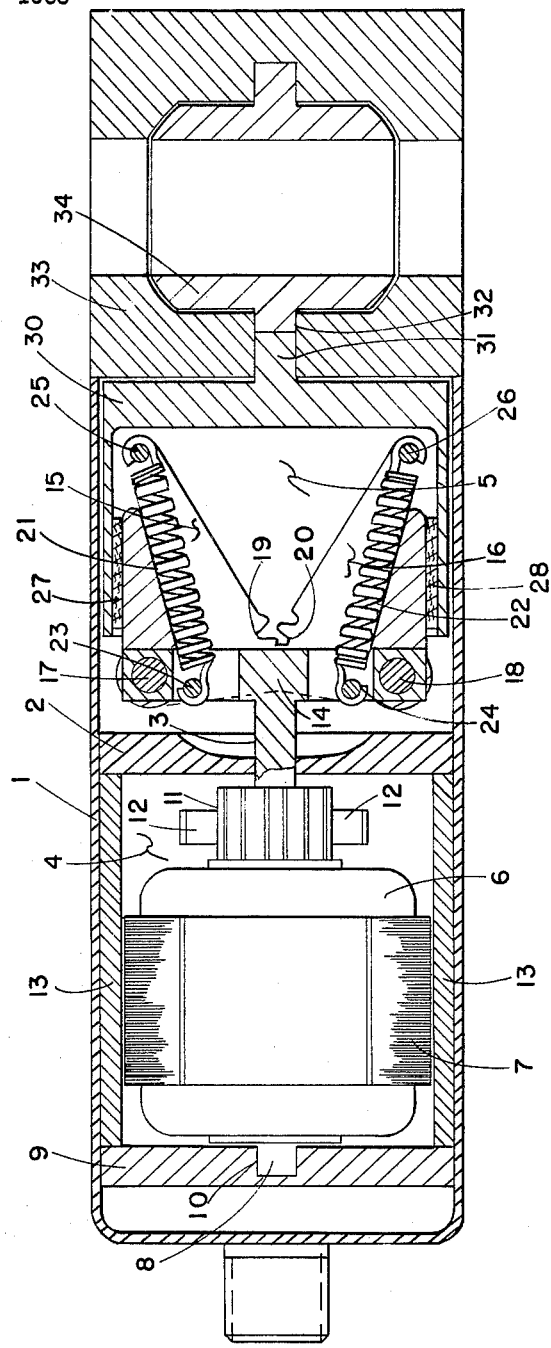
FIGURE 1 is a sectional view of the actuator in an energized position.

FIGURE 1 is a cut-away of the actuator and includes a cylindrical housing 1 which serves as an enclosure for the actuator assembly. The plate 2 with opening 3 therein is contained in the housing 1 and divides the housing into compartments 4 and 5 respectively. Compartment 4 contains a 2-direction electric motor having an armature 6 with windings 7 thereon. The armature 6 is integral with and rotates on a spindle 8. The spindle 8 is suitably journaled in opening 3 of end plate 2 and in opening 10 of end plate 9. The commutator assembly consists of a split ring 11 and brushes 12. Electrical energy is supplied to the windings 7 on the armature 6 via the commutator assembly 11–12. The field for the motor can consist of a permanent magnet 13 or a wound field (not shown). Since the armature 6 is integral with the spindle 8, rotation of the armature 6 upon application of a current to the brushes 12 necessarily causes rotation of the spindle 10.

The spindle 10 extends through the opening 3 in end plate 2 and is directly attached to a base 14. The base 14, more clearly shown in FIGURE 8, is integral with the spindle 10. Two substantially identical centrifugal weights 15 and 16 are pivotally connected to base 14 by suitable means at pivot points 17 and 18 respectively. The weights have gear segments, 19 and 20, respectively, near each base which are adapted to intermesh such that the weights are incapable of independent movement about their pivot points 17 and 18. Retaining springs 21 and 22 are provided to restrain the movement of the weights 15 and 16. The respective springs 21 and 22 are each joined at one end to the base 14 by suitable pivot means 23 and 24. The other end of the springs 21 and 22 are attached to the weights 15 and 16 by suitable pivot means 25 and 26.

The outer periphery of the weights carry a brake lining material 27 and 28. Compartment 5 further contains a driven member 30 which is in the form of a cylindrical cup. The inside surface of the driven member 30 is adapted to be driven by the weights 15 and 16 via brake linings 27 and 28. The driven member 30 is integrally connected to shaft 31 which is journaled in opening 32 of valve base 33. Shaft 31 is directly connected to valve 34.

For an adequate understanding of applicant's invention, it is necessary to refer to the schematic drawings of FIGURES 6 and 7 which depict the forces generated by the springs and centrifugal weights, and the particular inter-relationship of the respective pivot points. Pivot points 17 and 23 are on the base member and are thereby maintained in a constant spaced relationship. Pivot point 25 is carried on weight 15 which is movable, thereby making pivot point 25 movable relative to pivots 17 and 23.

FIGURE 6 shows the position of the spring and weight when the actuator is de-energized, i.e., before it reaches its critical speed of rotation. The centrifugal force generated is a function of the mass of weight 15, and the lateral displacement of the center of gravity of the weight 15 from the pivot 17. For purposes of illustration, point 35 will be considered the center of gravity of weight 15. The center of gravity 35 is laterally displaced from the plane of rotation of pivot 17 by the distance B. The normal torque (centrifugal force) of the weight 15 about pivot point 17 is the force generated through point 35 normal to the axis of rotation of the weight 15 multiplied by the distance B (FB). In actual practice, the distance B is quite small, thereby minimizing the initial torque value developed and obviating the necessity for using a heavy spring at 21. The restraining force of spring 21 is exerted along the force axis of the spring opposite to the centrifugally generated force and is a function of both the spring force (resistance to deformation) and the distance the spring 21 is displaced from pivot 17. In this instance, A the restraining torque assumes the formula ($F_1A$).

When the speed of rotation exceeds a predetermined critical r.p.m. value, the weights will rapidly swing outward and attain the position indicated in FIGURE 7, as is apparent from the following discussion. As the weight 15 moves outward, the lateral distance of the center of gravity 35 from pivot 17 increases, thereby increasing the total effective torque to a value of (FB+). At the same time that the total effective centrifugal force generated is increasing, the distance between the spring 21 and pivot 17 is decreasing, thereby lowering the effective counter-torque which restrains outward movement of weight 15 to the value ($F_1A-$). This increasing unbalance of respective forces results in a tremendously accelerated outward movement of weight 15.

It should be noted that since the center of gravity 35 is maintained in close laterally to pivot 17 upon initial actuating of the motor, a substantial speed must be reached before any extension of the spring 21 takes place. In the process of reaching this terminal speed, the weights 15 and 16 are effectively storing up energy for subsequent release to the driven member 30. The fast acting movement of the weights contribute to a sharp activation of driven means 30.

Figure 2:
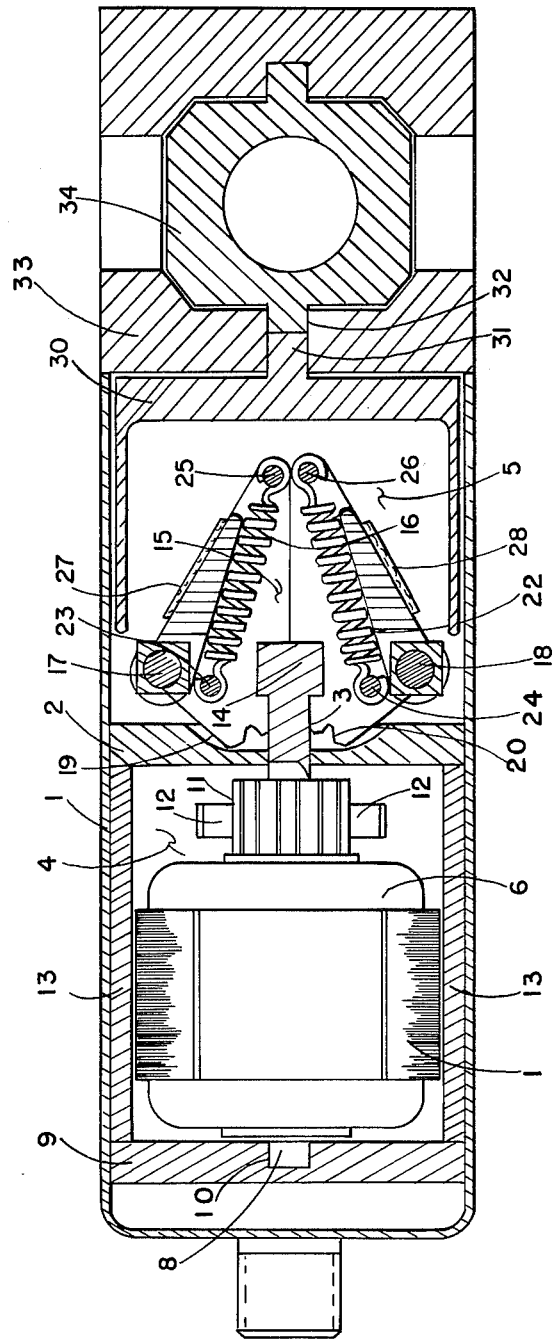
FIGURE 2 is a sectional view of the actuator in a de-energized position.

FIGURE 2 is similar to FIGURE 1 and shows the the valve in a de-energized position with valve 34 in a closed position.

FIGURE 8 is an isometric view of the actuator and further shows a mechanism for cutting off the power to the electrical motor. Switches 36 and 37 are stationarily attached to the valve casing 33. Peg 38 is integrally attached to the driven member 30. Each switch includes a spring member 39 and 40 respectively. The switches 36 and 37 are contained in series relationship with the power supply circuit to the brushes 12. The switches are normally closed, i.e., if the spring members 39 and 40 are not depressed against the body of the switches, the switches 36 and 37 are closed and power is supplied to the brushes 12. The method of operation is rather obvious. When the driven member 30 is rotated through 90°, the peg 38 depresses either switch member 39 or 40, depending on the direction of rotation. Actuation of switch member 39 or 40 results in an opening of the circuit to the motor which in turn causes cessation of armature rotation. It is readily apparent that unless the switch 36 or 37 is actuated to open the circuit to the electrical motor, the armature will remain rotating. Ergo, unless the valve is actuated into its fully operative position, power will continue to be applied to the motor until the valve is in its fully operative position.

Figure 3:
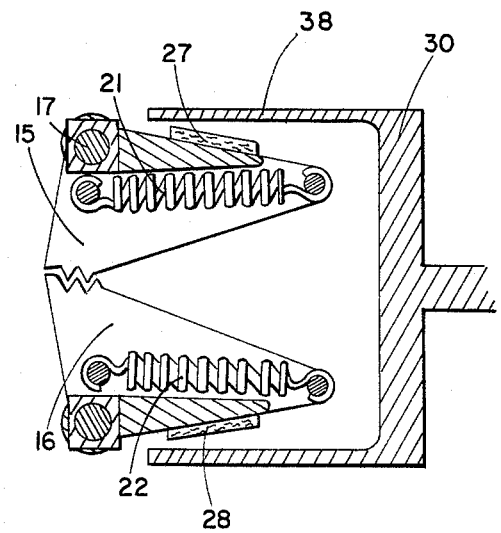
FIGURES 3–5 show an embodiment of the invention wherein a flexible driven member is employed.
Figure 4:
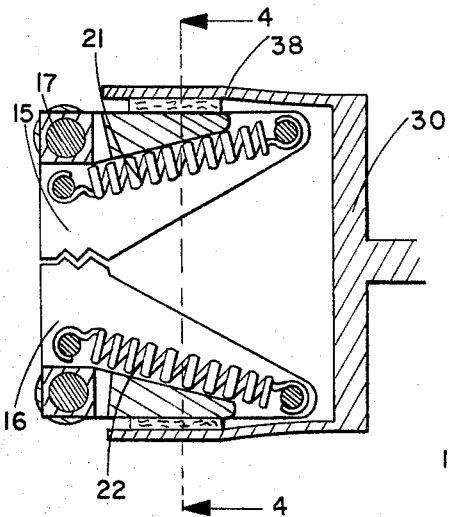
Figure 5:
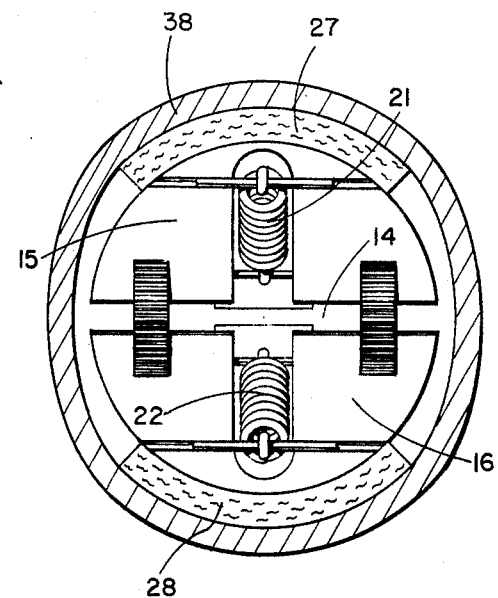

The embodiment shown in FIGURES 3, 4 and 5 includes a modification of the driven member 30. It is important that positive traction is achieved between the centrifugal weights and the driven member. Good traction is achieved by the use of friction pads 27 and 28 on the outer surface of the centrifugal weights 15 and 16. However, this traction can be increased if the modification shown in FIGURES 3, 4 and 5 is employed. In this embodiment the cylindrical portion of the cup-like driven member 30 is made out of a flexible material, such as rubber or plastic. The normal cross-sectional shape of the driven member would be circular as shown in FIGURE 3. However, when the weights are thrown outwardly against the cup 38, deformation of the cup takes place, changing it to a somewhat eliptical configuration, as shown in FIGURE 5. Due to this distortion, it is obvious that a more positive locking action between the weights and the driven member is achieved.

The foregoing is intended to be illustrative of one embodiment of the centrifugal actuator. It is appreciated that modifications of the actuator can be made without departing from the scope of the instant invention, which contemplate other and different embodiments. Applicant, therefore, only intends to limit himself to the invention as set forth in the appended claims.

I claim:
1. A centrifugal clutch assembly comprising a driven means and a driving means, said driven means having a hollow cylindrical portion, said driving means comprising a base member rotatable about a clutch axis, an arcuate centrifugal weight, a friction pad attached to the outer periphery of said centrifugal weight and adapted to contact said cylindrical portion first pivot, means con- necting said weight to said base member, resilient means normally urging said weight out of contact with said driven member, one end of said resilient means being connected to an extremity of the weight at a second pivot point, the other end of said resilient means being connected to said base member at a third pivot point, said first pivot point being axially located between said second and third pivot points, the longitudinal axis of the resilient means being located between the center of gravity of the weight and the first pivot point, whereby an increase in the speed of rotation of the centrifugal weight past a predetermined critical speed causes the center of gravity of the weight to increase its axial displacement from the first pivot point while the displacement of the longitudinal axis of the resilient means from the first pivot point is simultaneously decreased.

2. A centrifugal clutch assembly as set forth in claim 1 including a plurality of the weights and the associated resilient means.

3. A centrifugal clutch assembly as set forth in claim 2 wherein said resilient means includes a plurality of light springs.

4. A centrifugal clutch assembly as set forth in claim 2 including means to insure simultaneous movement of the weights.

5. A centrifugal clutch assembly as set forth in claim 1 wherein said cylindrical portion is flexible.

References Cited by the Examiner

UNITED STATES PATENTS

| | | | |
|---|---|---|---|
| 729,845 | 6/1903 | Cherry | 192—105 X |
| 1,823,881 | 9/1931 | Ackerman et al. | 192—105 |
| 1,937,971 | 12/1933 | Mack | 192—105 |
| 2,038,450 | 4/1936 | Roesch | 192—105 X |
| 2,346,668 | 4/1944 | Dunham. | |
| 2,463,100 | 3/1949 | Gredell | 192—105 X |
| 2,499,533 | 3/1950 | Sohlberg | 192—105 |
| 2,647,603 | 8/1953 | Smith | 192—105 |

FOREIGN PATENTS

| | | |
|---|---|---|
| 235,711 | 7/1960 | Australia. |
| 182,015 | 10/1954 | Austria. |
| 531,504 | 9/1954 | Belgium. |

DAVID J. WILLIAMOWSKY, *Primary Examiner.*

DON A WAITE, *Examiner.*

B. W. WYCHE III, *Assistant Examiner.*